(12) United States Patent
Lanes et al.

(10) Patent No.: US 9,207,331 B2
(45) Date of Patent: Dec. 8, 2015

(54) USING STATISTICAL ANALYSIS TO INFER AN ACCURATE GPS LOCATION FOR USE IN TRACKING DEVICES

(71) Applicant: Numerex Corp., Atlanta, GA (US)

(72) Inventors: Troy E. Lanes, Belgrade, MT (US); Robert A. Wachtel, Clearwater, FL (US); Mark L. Belangee, Collegeville, PA (US)

(73) Assignee: Numerex Corp., Atlanta, GA (US)

( * ) Notice: Subject to any disclaimer, the term of this patent is extended or adjusted under 35 U.S.C. 154(b) by 288 days.

(21) Appl. No.: 13/734,352

(22) Filed: Jan. 4, 2013

(65) Prior Publication Data

US 2013/0169475 A1    Jul. 4, 2013

Related U.S. Application Data

(60) Provisional application No. 61/583,063, filed on Jan. 4, 2012.

(51) Int. Cl.
*G01S 19/42*    (2010.01)
*G01S 19/40*    (2010.01)
*G01S 19/14*    (2010.01)

(52) U.S. Cl.
CPC ............ *G01S 19/40* (2013.01); *G01S 19/14* (2013.01); *G01S 19/42* (2013.01)

(58) Field of Classification Search
CPC ......... G01S 19/42; G01S 19/45; G01S 19/47; G01S 19/48; G01S 19/49
USPC ............... 342/357.25, 357.28, 357.3, 357.31, 342/357.32
See application file for complete search history.

(56) References Cited

U.S. PATENT DOCUMENTS

| | | | |
|---|---|---|---|
| 7,903,029 B2 | 3/2011 | Dupray | |
| 2005/0075119 A1* | 4/2005 | Sheha et al. | 455/456.6 |
| 2010/0194634 A1* | 8/2010 | Biacs et al. | 342/357.09 |
| 2011/0118979 A1* | 5/2011 | Mao et al. | 701/208 |
| 2011/0191052 A1 | 8/2011 | Lin et al. | |

* cited by examiner

*Primary Examiner* — Harry Liu
(74) *Attorney, Agent, or Firm* — Bell Nunnally & Martin LLP; Craig J. Cox (57) ABSTRACT

A system method for improving the accuracy of a tracking device is described where the tracking device cannot achieve an accurate GPS fix due to low observability. The system and method improves accuracy determining a current position for the tracking device using incomplete information from the GPS. The current position is added to a historical table of previous position determinations and a normalized center position is calculated from the current position and previous position determinations. The position of the tracking device is inferred from the normalized center position.

15 Claims, 10 Drawing Sheets

USING STATISTICAL ANALYSIS TO INFER AN ACCURATE GPS LOCATION FOR USE IN TRACKING DEVICES

CROSS REFERENCE TO RELATED INFORMATION

This application claims the benefit of U.S. Provisional Patent Application No. 61/583,063, filed Jan. 4, 2012, the contents of which are hereby incorporated herein in its entirety.

TECHNICAL HELD

The present disclosure is directed to location tracking, and more particularly to a system and method to infer an accurate location from sub-optimal GPS information.

BACKGROUND OF THE INVENTION

Commercially available GPS receivers for use in tracking devices calculate cold-fix position information based on information received from the GPS constellation. In many cases, due to the low power nature of the GPS satellite transmitters, enough information from which to deduce position information is unavailable. In these cases, the application reliant upon position information typically reports that a fix cannot be determined, locks, and continues to attempt to receive adequate signal to calculate an accurate position. While the GPS information received may not be enough for a precise location fix, the information may be sufficient to allow a device to infer its position from multiple fixes using the unreliable information available from the GPS. Though each fix is itself not reliable, a plurality of fixes may be sufficient to calculate an inferred position for the device being tracked.

BRIEF SUMMARY OF THE INVENTION

In a preferred embodiment, a method for improving the accuracy of a tracking device where the tracking device cannot achieve a complete fix using a location determination mechanism is described. The method includes determining a current position for the tracking device using incomplete information from the location determination mechanism. The current position is added to a historical table of previous position determinations and a normalized center position is calculated from the current position and previous position determinations. The position of the tracking device is inferred from the normalized center position.

In another embodiment, a system for improving the accuracy of a tracking device, where the tracking device cannot achieve a complete fix using a location determination mechanism is described. The system includes one or more tracking devices, each tracking device having a location determination mechanism for determining a current position for the tracking device. The tracking device is operable to calculate a current position using incomplete information from the location determination mechanism. A monitoring center monitors each of the one or more tracking devices using a communications interface on each tracking device. The system is operable to calculate a normalized renter position from the current position and a historical table of previous position determinations for each tracking device, and to infer the position of each of the tracking devices from the normalized center position.

In yet another embodiment, a method for improving the accuracy of a tracking device where the tracking device cannot achieve a complete fix using GPS is described. The method includes determining a current position for the tracking device using incomplete information from the GPS. The current position is added to a historical table of previous position determinations, and a normalized weighted center position is calculated from the current position and previous position determinations. The position of the tracking device is inferred from the normalized weighted center position. The method also includes calculating an acceptable error radius around the normalized center position. Movement of the tracking device is detected using an inertia sensor, and the historical table of previous positions is cleared in response to the detection of movement.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DESCRIPTION OF THE INVENTION

The present invention describes a process that utilizes embedded statistical analyses to improve accuracy and to ameliorate inadequate sensory information in partially observable environments to determine the true position of the device(s) being tracked. In preferred embodiments, position is determined used on historical GPS information, inertial fluctuations, observability of the environment and is enhanced or inferred based on distance from an increasingly accurate Gaussian normalized weighted center position. Additionally, in certain embodiments the process takes into consideration possible failure of internal sensors and corrects accordingly.

Currently available GPS receivers do not provide advanced methods for calculating position outside of the information provided from GPS satellites. Additionally, such receivers may implement dead-reckoning, such as traversal of a tunnel where GPS signal cannot be acquired, but require connections to external sensors, current and accurate vector information, and knowledge of the road segment upon which it is traveling. In this invention all sensors are self contained and require no external sensors, no knowledge of road segments, and can begin with no vector information.

Figure 1:
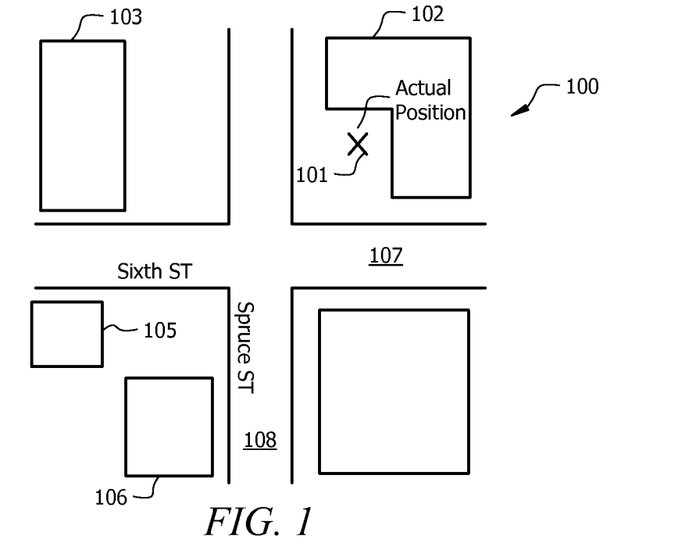
FIG. 1 is a simplified map showing an example of a position of a device hung tracked relative to geographic landmarks such as buildings and roads.

Retelling now to FIG. 1, a simplified map 100 is depicted that shows the environment in which a tracking device is located. Actual position 101 is shown relative to surrounding geographic features such as buildings 102, 103, 105 and 106 and streets 107 and 108. The device being tracked can be any type of device that includes sufficient electronics to allow it to receive GPS signals or other location determination signals. The processing of the GPS information can be done at the device or can be done at a remote location after the location information is transmitted by the device over a network such as a cellular, will, radio frequency or other communications medium.

Figure 2:
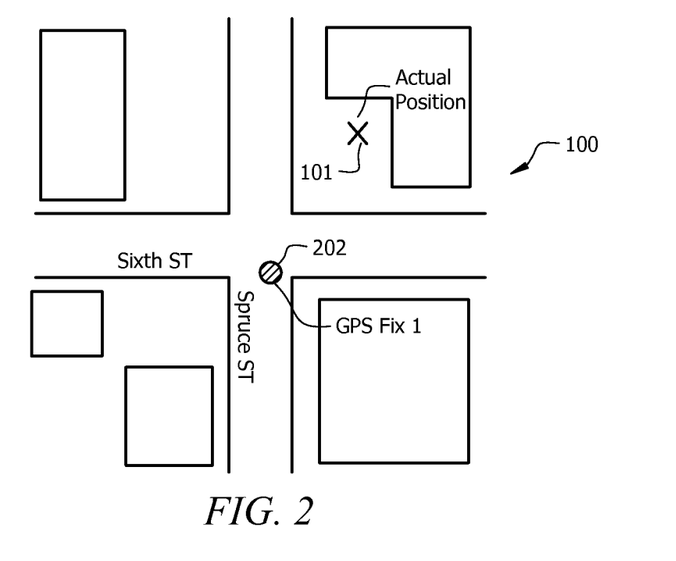
FIGS. 2-4 are simplified maps according to FIG. 1 showing partial location fixes and an estimated location determination based on embodiments of a system and method according to the concepts described herein.
Figure 3:
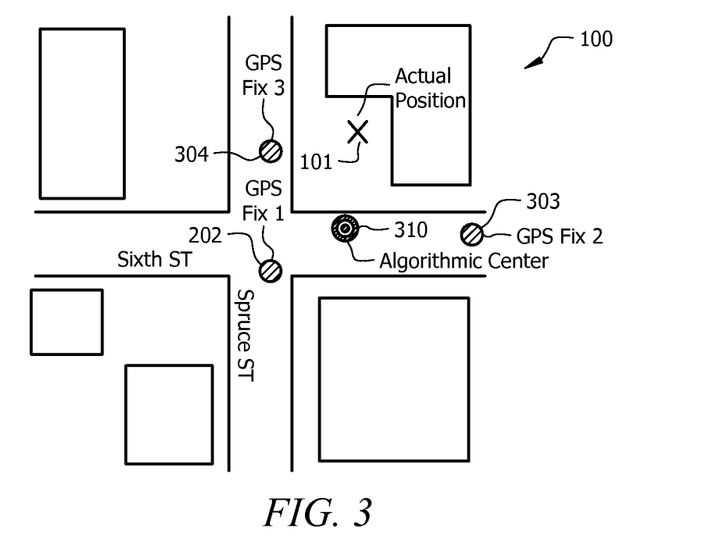
Figure 4:
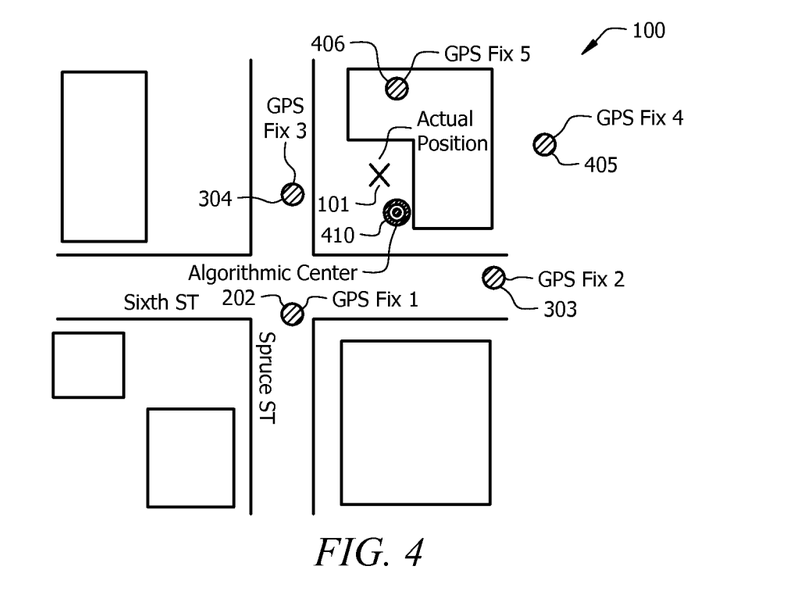

FIG. 2 depicts the first GPS fix 202 acquired by the GPS receiver in the tracking device. This is the position that, in preferred embodiments, is reported to the tracking application either on the device or at a remote server. FIG. 3 depicts a second and third GPS fix 303 and 304, respectively. Using the first GPS fix 202, and the second and third GPS fix 303 and 304, the system of the present invention is able to calculate the resultant algorithmic center 310. The algorithmic center 310 may be calculated as a normalized Gaussian distribution between all known acceptable GPS fixes or may be calculated in any other appropriate manner consistent with the concepts described herein. In preferred embodiments, the center is calculated after the second GPS fix 303 and updated with each subsequent GPS fix. FIG. 4 depicts a fourth 405 and fifth 406 GPS fix. Note that the new center 410 has shifted from that depicted in FIG. 3. The fourth 405 and fifth 406 GPS fix further build the table of historical fix data and accordingly update the algorithmic center 410.

Figure 5:
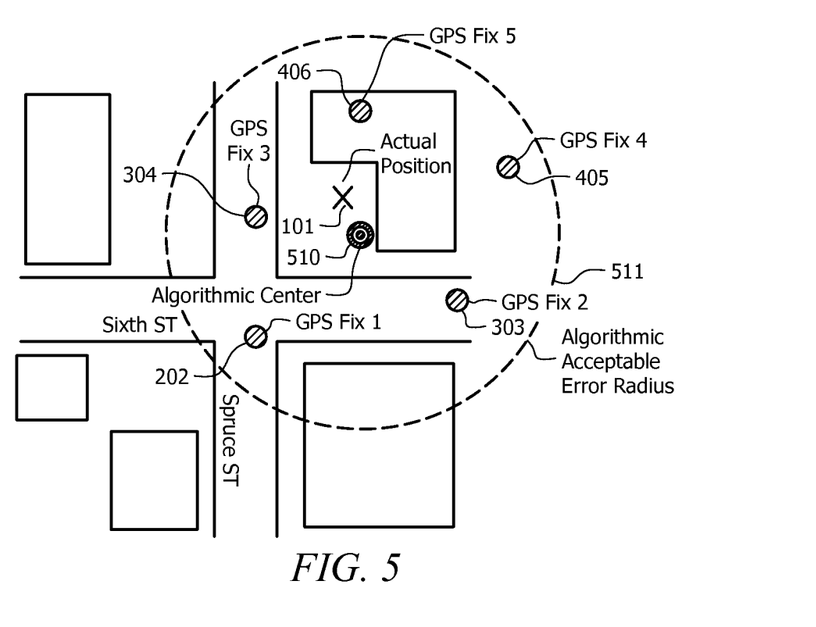
FIGS. 5 and 6 are simplified maps according to FIGS. 1-5 showing partial location fixes, an estimated location determination, and a calculated error radius and fault radius, respectively, based on embodiments of a system and method according to the concepts described herein.
Figure 6:
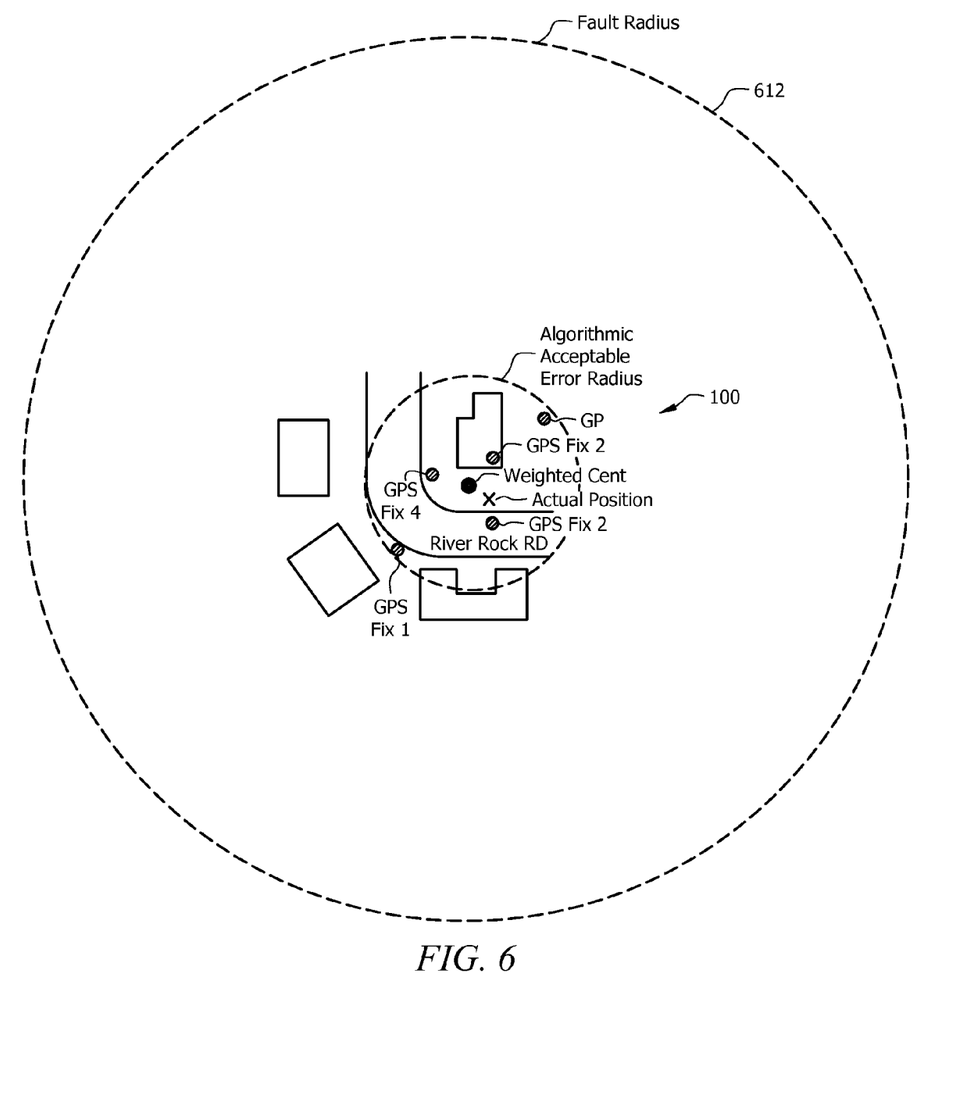

FIGS. 5 and 6 depict an embodiment of the system in which the algorithm achieves an adjustable confidence level based on accumulated historical data. GPS fixes 202, 303, 304, 405 and 406 are sufficiently grouped to allow the system to calculate an acceptable error radius that includes all of the acceptable historical GPS fixes. The error radius 511 is used to evaluate new GPS fixes, both for their accuracy and to determine if the tracking device has been moved and the inertial sensors have failed.

In a preferred embodiment, when the tracking device implementing the algorithm herein described has accumulated an acceptable historical record of data, and is required to transmit a periodic update, it can be programmed to transmit the coordinates of the algorithmic center rather than try to acquire a new GPS fix. Also, at an adjustable interval, the tracking device can be programmed to confirm that the inert al sensors have not failed by obtaining a new GPS fix. If the new GPS fix better matches the normalized Gaussian distribution the coordinates of the new fix can be used and the furthest outlier can be purged from the historical data table. If the new GPS fix is outside a second definable radius, referred to as fault radius 612, shown in FIG. 6, the inertial sensor can be flagged as bad until sufficient data has been collected to deem them correct. During the time when the sensors are flagged as had the tracking device should rely on GPS alone to determine position.

Figure 7:
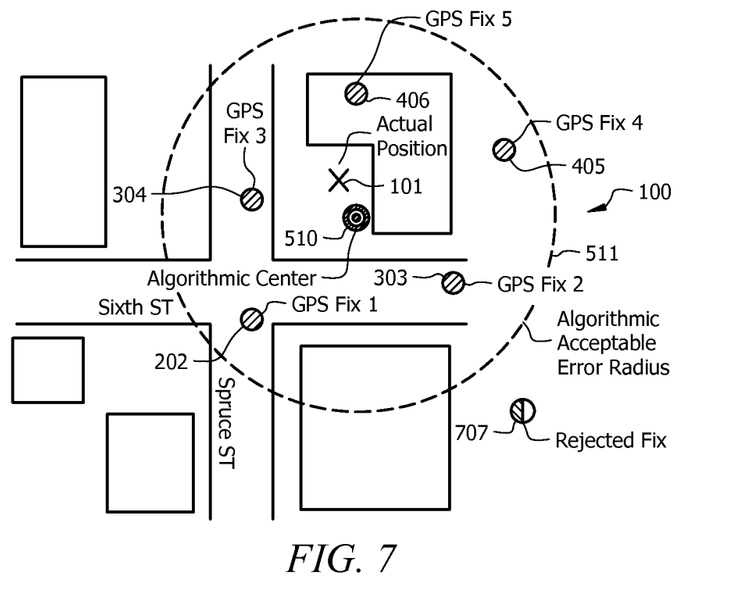
FIG. 7 is a simplified map according to FIGS. 1-5 showing partial location fixes, an estimated location determination, and a rejected fix based on the calculated, error radius, based on the concepts described herein.
Figure 8:
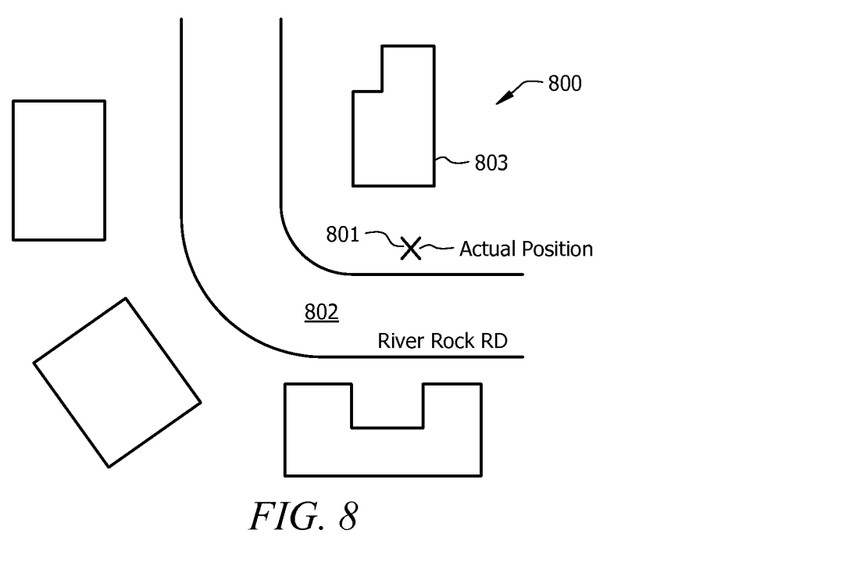
FIGS. 8-10 are simplified maps showing a position change of the device being tracked according to the concepts described herein.

FIG. 7 illustrates a GPS fix acquired during the periodic sensor confirmation fix that has strayed outside the acceptable error radius but lies within the fault radius. In a preferred embodiment of the system, this fix shall be rejected and the algorithmic center shall be transmitted instead with a flag indicating such. FIG. 8 depicts the environment 800 after the tracking device has moved to a new location 801 proximate to building 803 and road 802. In a preferred embodiment, the tracking device is programmed to sense this based on inertial sensor measurements or deviation outside the fault radius.

Figure 9:
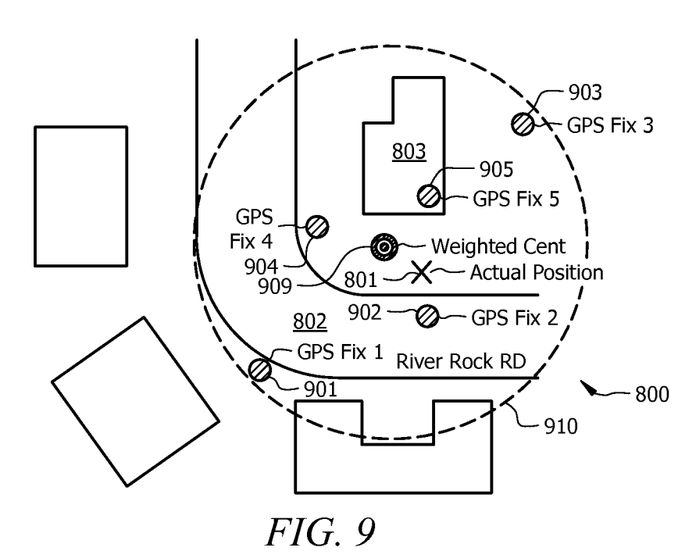
Figure 10:
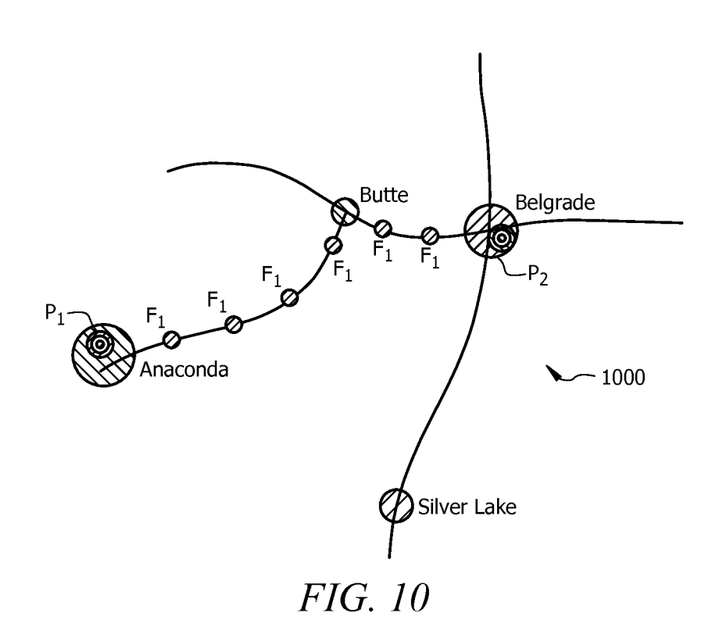

FIG. 9 depicts the tracking device in the new location after preferred embodiments of the system have acquired enough information to make a confident assertion about the true position. Once the tracking device has come to rest in position 801, GPS fixes, such as GPS fixes 901, 902, 903, 904 and 905 are added to the historical data record to determine the calculated center 909. As in the illustrations shown in FIGS. 1-8, the error radius 910 and fault radius (not shown) will be recalculated to make use of the knowledge of determined position including but not limited to: improve accuracy, provide good data when GPS signal can be acquired, and save battery power consumption. FIG. 10 depicts the tracking device while in motion between the two illustrated locations (P1 and P2). The tracking device uses information provided by the GPS receiver and inertial sensors to determine that it is in motion. When motion begins, preferred embodiments of the system erase all historical information and does not resume building history tables until it has determined that it has stopped moving. During motion only the GPS receiver information shall be considered for inclusion in coordinates transmitted to the tracking application (multiple instances of $F_1$).

Figure 11:
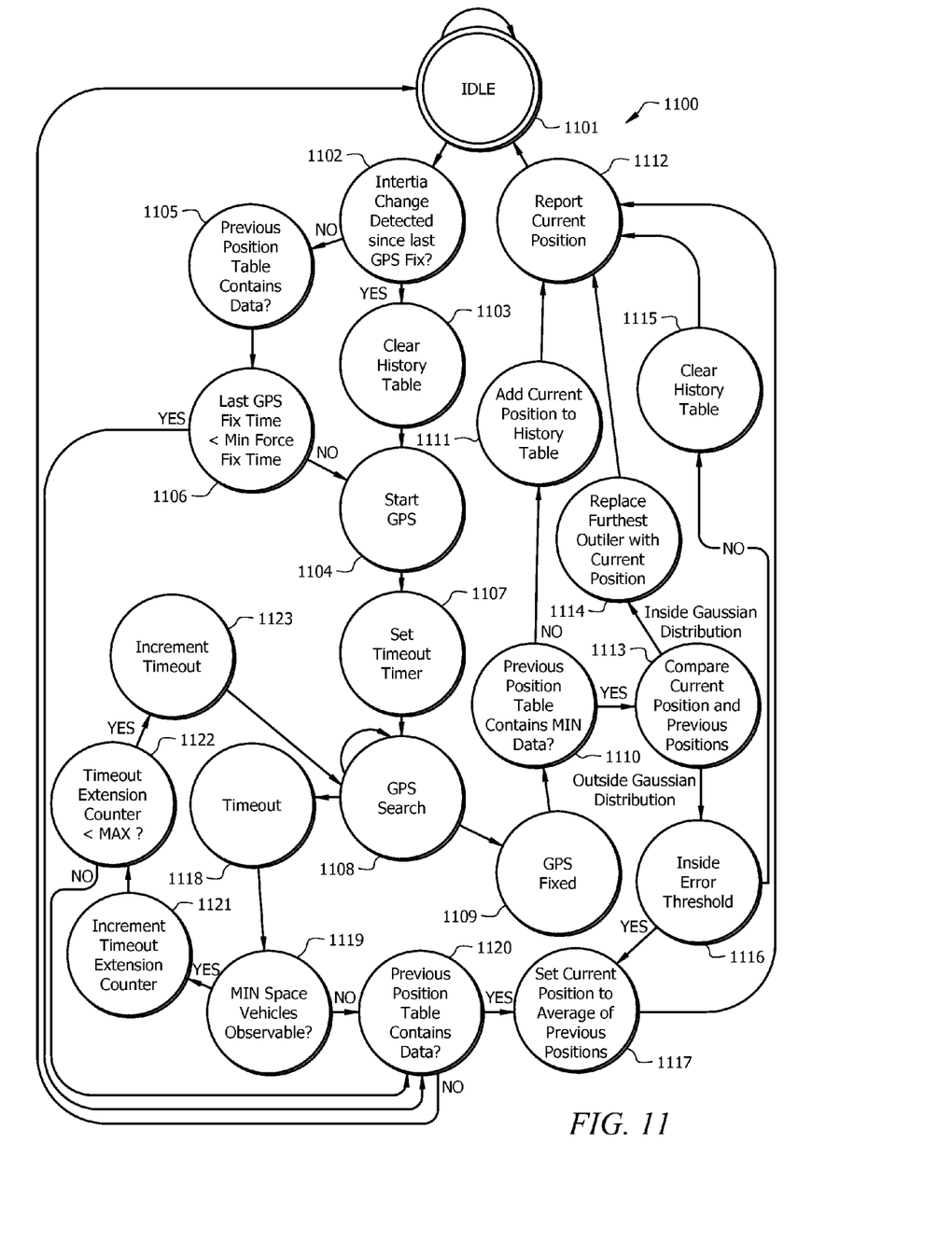
FIG. 11 is a state diagram showing an embodiment ala process for inferring accurate GPS location using incomplete GPS fixes according to the concepts described herein.

FIG. 11 shows a state diagram that illustrates a preferred embodiment of a state machine for a tracking device or system to implement as system and method according to the concepts described herein. The state machine may be implemented in any combination of hardware or software without affecting its desired operation. Process 1100 begins in idle state 1101, from idle state 1101 the process moves to state 1102 where it is determined if an inertia change has been detected, indicating movement of the tracking device, if the tracking device has not detected an inertia change, the state moves to state 1105 where it determines if the previous position table contains data before moving to state 1106 where a timer is checked to see if it is time for a new GPS fix. If the timer has time remaining before a GPS fix is to be taken, the state moves to state 1120 which determines if the previous data table has data. If not, the state is returned to the idle state 1101, but if the table does contain data, the state moves to state 1117 where the current positions are averaged, as required, and the current position is set to the average of the previous positions. The current position is then reported in state 1112 and the state is returned to idle state 1101.

Returning to state 1106, if the tinier is greater than the GPS fix time, the state passes to state 1104 which starts the GPS engine. The GPS engine is also started in response to an inertia change being detected in state 1102, but only after the history table is cleared in state 1103. Alter the GPS engine is started in state 1104, a timeout timer is set in state 1107, and a GPS search is performed in state 1108. If the GPS search times out as shown in state 1118, the state passes to state 1119 which determines if the minimum number of GPS satellites, or other location determinations mechanisms, such as cell towers, are observable by the tracking device. If not, the state passes to state 1120 and proceeds as described above. If the minimum number of satellites are observable, the state passes to a timeout extension calculator in state 1121 where the extension counter is incremented. State 1122 then determines if the extension counter has exceeded a threshold. If so, the state passes again to state 1120, if not, it passes to state 1123 where the timeout is incremented before passing back to the GPS search in state 1108.

While in state 1108, if it is determined that a GPS fix is obtained, as shown by state 1109, the state passes to state 1110 where it is determined if the history, or previous position table, has the desired number of entries, if not, the state passes to state 1111 here the new location fix is added to the position history table and then the position is reported in state 1112. If, in state 1110, it is determined that the table does have the desired number of entries, the state passes to state 1113 where the new position fix is compared to previous position fixes. Utile new position is outside of the Gaussian distribution, or acceptable error radius, it is checked against the fault radius in state 1116. If it is inside the fault radius, the state moves to state 1117 and proceeds as described above. If it is outside the fault radius, the history table is cleared in state 1115 and the current position is reported in state 1112. Returning to state 1111 if the current position is within the error radius, the furthest outlier position in the history table is replaced with the current position in state 1114 and the current position is reported in state 1112 before the process returns to the idle state 1101.

Figure 12:
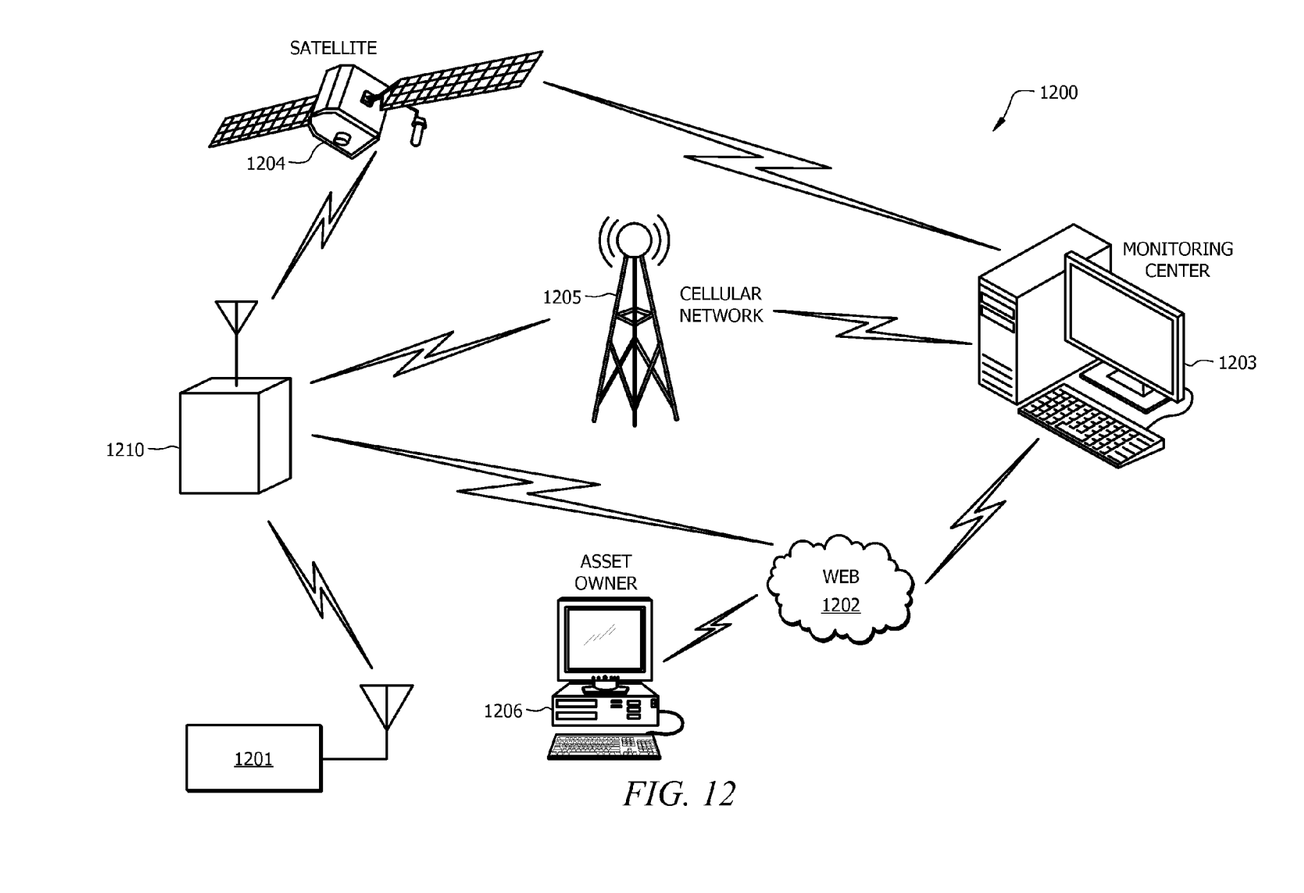
FIG. 12 is a block diagram of an embodiment of a system for location determination and reporting according to the concepts described herein.

Referring now to FIG. 12, an embodiment of a system for monitoring a tracking device according to the concepts described herein is shown. The tracking device 1210 includes electronics capable of communicating with one or more types of networks. In certain embodiments, the tracking device 1210 or its associated electronics module would be able to receive GPS signals from satellite network 1204 where they are available and send its location coordinates to a data center 1203 using the cellular network 1205, satellite communications, or other communications protocol. If the mobile object cannot receive the GPS signals or does not have GPS capabilities, then it could use location based services using cellular network 120 according to the concepts described herein. The tracking device 1210 may also communicate wirelessly with other mobile objects, such as mobile object 1201.

In addition to location detection capabilities, tracking device 1210 has the appropriate electronics to communicate with a data center, or monitoring center, 1203. The data center 1203 receives the location information from the tracking device 1210 using any type of appropriate communications network, such as satellite network 1204, cellular network 1205, or data network 1202. Using the appropriate communications network, the tracking device 1210 is able to communicate its location, or au approximation thereof, and status. The owner or service provider of the tracking device 1210 or asset owner 1206 can retrieve location status and other data from data center 1203 using a data network 1202 connection.

Figure 13:
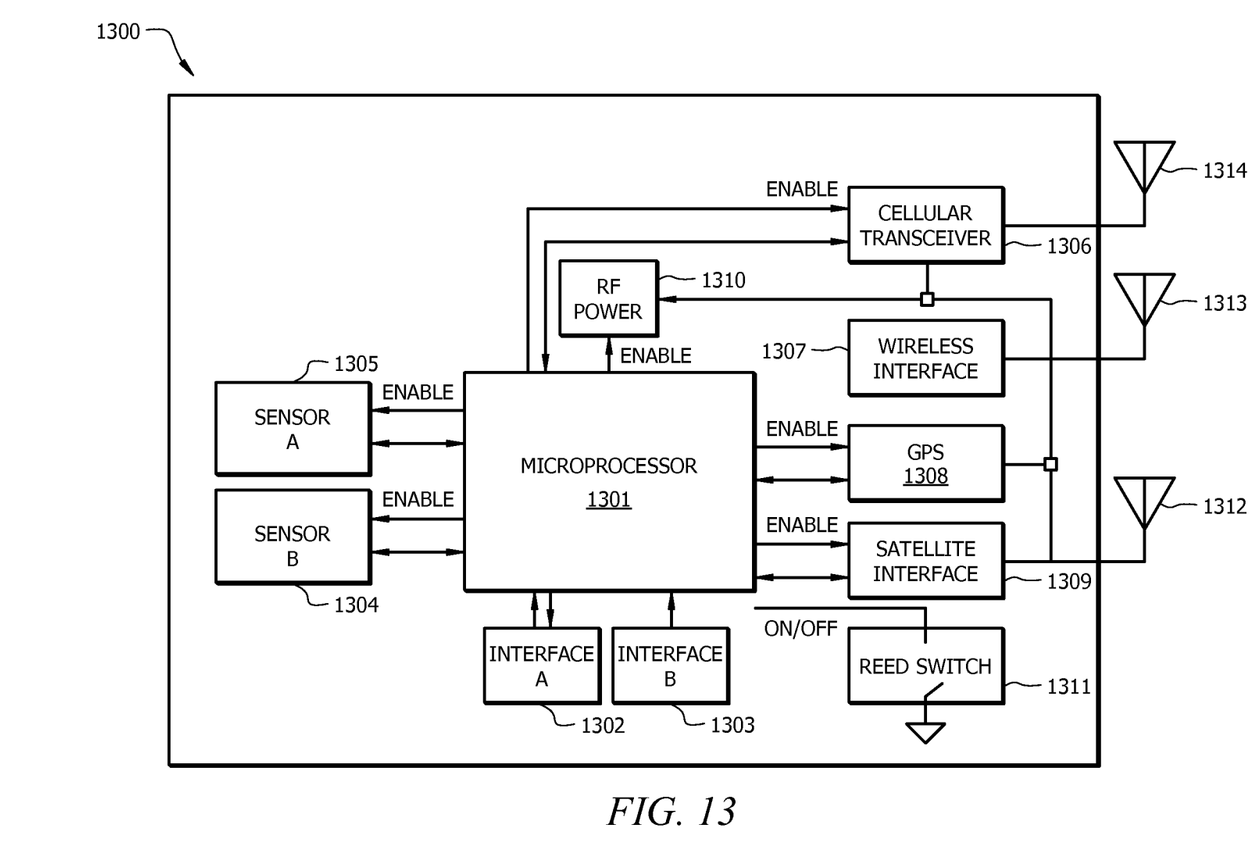
FIG. 13 is a block diagram of an embodiment of an electronics module for use in location determination and reporting according to the concepts described herein.

Referring now to FIG. 13, a preferred embodiment of an electronics module for use with a tracking device according to the concepts described herein, is shown. The module 1300 includes a microprocessor 1301 programmable to execute desired instructions and to control the operation of module 1300. The processor 1301 may have internal memory capable of storing data and programming information or may use memory external to the microprocessor. The module 1300 also includes a cellular transceiver 1306 and associated cellular antenna 1314 to perform cellular communications. Power for the cellular transceiver is supplied by RE power module 1310. The module 1300 may also include a satellite location determination device 1308, which can be GPS or satellite service based, and a satellite interface 1309, which can be a transmitter, receiver or transceiver, which uses satellite antenna 1312. Wireless interface 1307 controls communication with wireless data networks, such as wifi or bluetooth, using antenna 1313.

Interlaces 1302 and 1303 allow for interaction with the module through a physical connector, input device, wireless interface or other mechanism to interact directly with the tracking device. Sensors 1304 and 1305 can be any type of sensor that is used to collect data by module including sensors to detect environment conditions around the module, contact sensors, vibration sensors, motion or inertia sensors, short range radar sensor or other type of sensor that can be used to detect information of interest. Other sensors can also be included that detect other tracking device attributes or environmental information. Such information can be collected and reported to the data center or can also be used to trigger actions by the tracking device. Reed switch is an electrical switch that is activated by a magnetic field and can be used to enable or disable the device.

The location and status information of the tracking device cam be periodically reported to a monitoring center, either at regular intervals or upon the occurrence of a particular event. Embodiments of the tracking device can also be programmed to receive information from the monitoring center, such as software and program updates.

Figure 14:
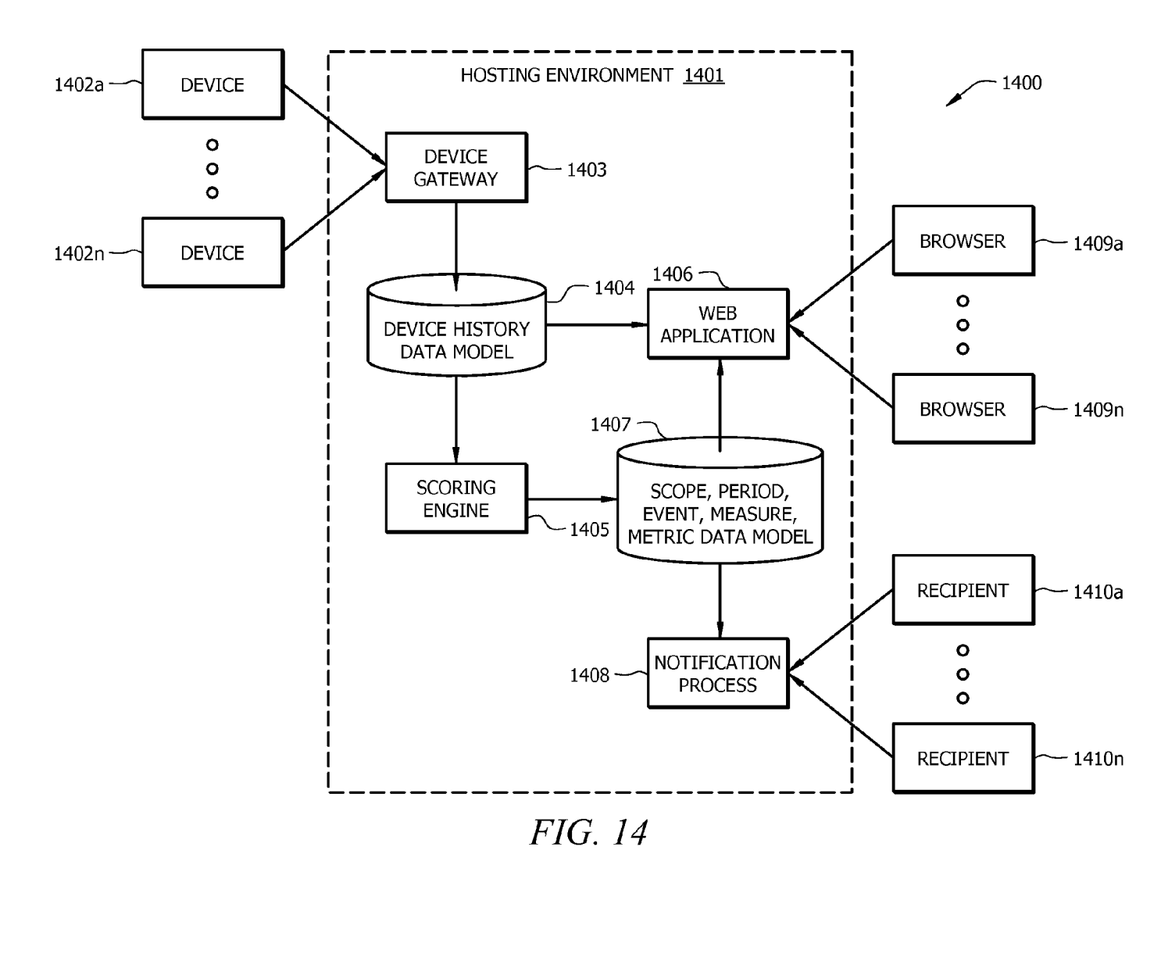
FIG. 14 is a block diagram of an embodiment of an analytical engine which can be used to implement the location determination system and method described herein.

Referring now to FIG. 14 an embodiment of an analytical engine 1401 that can be used with the location determination system and method described herein is shown. System 1400 includes the analytical engine 1401. A device communications gateway 1403 in analytical engine 1401 is operable to receive messages from tracking devices 1402a-1402n over various communications networks, which can include low earth orbit (LOE) satellite (for example, OrbitOne/GlobalStar), GPRS or radio frequency (RF) wireless networks, and/or general IP networks (such as the Internet). The gateway 1403 parses messages based on device/network type to extract encoded data that can be unique for each of the devices. This can include any type of information and may include location information such as latitude/longitude where the device was located when the data was collected.

A device history data model 1404 maintains the population of devices, that can report data including the network over which it can communicate and its unique identity on that network. The device history data model 1404 also maintains a history of readings received from each device and maintains properties for each device. The device history data model 1404 receives readings queued up by the gateway 1403 for availability to the scoring engine 1405. The scoring engine also maintains in a database a set of "device measures," 1407 each device measure utilized to capture customizable aggregate statistics of data from all readings for each device for a specific period start and duration. This data is collected for all "scorable" devices and is independent of any scope.

The scoring engine 1405 is operable to process readings for all devices 1402a-1402n to create device measures and in the case of the location determination technique described herein can be used to perform the calculations and analysis described above. The scoring engine 1405 also can be used to maintain a set of scope/device notification policies 1408. These notification policies 1408 can contain customizable information about what kind of notification, typically an email sent to a recipient, or recipients, 1410a-1410n interested in a particular score or in the case of the location determination described herein, an alert with the location of the remote device, or an alert when the remote device is not where it is expected to be.

Additionally, analytical engine 1401 includes a web application 1406 that provides a portal for users to log into system 1400 and view information concerning the remote devices, such as location, the information collected from the remote device or to push information or programming to the remote devices. The users interact with web application 1406 using standard browser interfaces 1409a-1409n.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein ma be utilized according to the present invention. Accordingly, the appended claims are intended to include within their scope such processes, machines, manufacture, compositions of matter, means, methods, or steps.

What is claimed is:

1. A method for improving the accuracy of a tracking device where the tracking device cannot achieve a complete fix using a location determination mechanism, the method comprising:
    determining a current position for the tracking device using incomplete information from the location determination mechanism;
    adding the current position to a historical table of previous position determinations;
    calculating a normalized center position from the current position and previous position determinations;
    inferring the position of the tracking device from the normalized center position;
    detecting the movement of the tracking device using an inertia sensor; and
    clearing the historical table of previous positions in response to the detection of movement.

2. The method of claim 1 wherein the location determination mechanism is GPS.

3. The method of claim 1 wherein the failure to achieve a complete fix is caused by the tracking device being in a low observability position relative to the GPS satellites.

4. The method of claim 1 wherein the normalized center position is a weighted normalized center position.

5. The method of claim 1 further comprising calculating an acceptable error radius around the normalized center position.

6. The method of claim 5 further comprising rejecting a current position determination if it is outside the acceptable error radius.

7. The method of claim 1 further comprising calculating a fault radius around the normalized center position, wherein the fault radius is used to detect failure of an inertia sensor in the tracking device.

8. A system for improving the accuracy of a tracking device where the tracking device cannot achieve a complete fix using a location determination mechanism, the system comprising:
    one or more tracking devices, each tracking device having a location determination mechanism for determining a current position for the tracking device, wherein the tracking device is operable to calculate a current position using incomplete information from the location determination mechanism, each of the one or more tracking devices including a communications interface and an inertia sensor in each of the one or more tracking devices, the inertia sensor used to detect the movement of the tracking device; and
    a monitoring center monitoring each of the one or more tracking devices using the communications interface of each tracking device;
    wherein the system is operable to calculate a normalized center position from the current position and a historical table of previous position determinations for each tracking device, and to infer the position of each of the tracking devices from the normalized center position, and wherein the historical table of previous position determinations is cleared when movement of the tracking device is detected.

9. The system of claim 8 wherein the calculation of a normalized center position is performed by the tracking device.

10. The system of claim 8 wherein the calculation of a normalized center position is performed by the monitoring center.

11. The method of claim 8 wherein the system calculates an acceptable error radius around the normalized center position and rejects a current position determination if it is outside the acceptable error radius.

12. The method of claim 8 wherein the system calculates a fault radius around the normalized center position, wherein the fault radius is used to detect failure of an inertia sensor in the tracking device.

13. A method for improving the accuracy of a tracking device where the tracking device cannot achieve a complete fix using GPS, the method comprising:
    determining a current position for the tracking device using incomplete information from the GPS;
    adding the current position to a historical table of previous position determinations;
    calculating a normalized weighted center position from the current position and previous position determinations;
    inferring the position of the tracking device from the normalized weighted center position;
    calculating an acceptable error radius around the normalized center position;
    detecting the movement of the tracking device using an inertia sensor; and
    clearing the historical table of previous positions in response to the detection of movement.

14. The method of claim 13 further comprising rejecting a current position determination if it is outside the acceptable error radius.

15. The method of claim 13 further comprising calculating a fault radius around the normalized center position, wherein the fault radius is used to detect failure of an inertia sensor in the tracking device.

* * * * *